United States Patent
Kim et al.

(10) Patent No.: US 12,457,011 B2
(45) Date of Patent: *Oct. 28, 2025

(54) NFC DEVICE POWERED ON IN RESPONSE TO RADIO FREQUENCY SIGNAL, NFC TAG CIRCUIT INCLUDED THEREIN, AND METHOD OF OPERATING THE NFC DEVICE

(71) Applicant: 3A Logics Inc., Gyeonggi-do (KR)

(72) Inventors: Sung Wan Kim, Gyeonggi-do (KR); Pyeong Han Lee, Gyeonggi-do (KR); Kwang Beom Park, Gyeonggi-do (KR); Sung Hun Chun, Gyeonggi-do (KR); Chang Ho Ryu, Gyeonggi-do (KR)

(73) Assignee: 3A LOGICS INC. (KR)

( * ) Notice: Subject to any disclaimer, the term of this patent is extended or adjusted under 35 U.S.C. 154(b) by 338 days.

This patent is subject to a terminal disclaimer.

(21) Appl. No.: 18/307,476

(22) Filed: Apr. 26, 2023

(65) Prior Publication Data
US 2024/0259047 A1    Aug. 1, 2024

(30) Foreign Application Priority Data
Jan. 31, 2023   (KR) ........................ 10-2023-0012337

(51) Int. Cl.
*H04B 5/72*    (2024.01)
*H02J 7/00*    (2006.01)
*H04B 5/77*    (2024.01)

(52) U.S. Cl.
CPC .............. *H04B 5/72* (2024.01); *H02J 7/0063* (2013.01); *H04B 5/77* (2024.01); *H02J 2207/20* (2020.01)

(58) Field of Classification Search
CPC .... H04B 5/72; H04B 5/77; H04B 5/70; H02J 7/0063; H02J 2207/20; G06K 19/0702;
(Continued)

(56) References Cited

U.S. PATENT DOCUMENTS 10,680,677 B2 *   6/2020   Wobak ..................... H04B 5/45
12,260,275 B2 *   3/2025   Kim ......................... H04B 5/70
(Continued)

FOREIGN PATENT DOCUMENTS

| EP | 2196129 A4 * | 6/2015 | ......... A61B 1/00036 |
| WO | WO-2014061458 A1 * | 4/2014 | ......... A61B 1/00025 |
| WO | WO-2014102768 A1 * | 7/2014 | ......... A61B 1/00006 |

OTHER PUBLICATIONS

Extended Search Report dated Oct. 19, 2023, corresponding to European application No. 23170067.5, 8 pages.

*Primary Examiner* — Yuwen Pan
(74) *Attorney, Agent, or Firm* — J. Clinton Wimbish; Maynard Nexsen PC (57) ABSTRACT

Disclosed is an NFC device not having a power button. The NFC device includes a battery including a voltage output terminal from which a battery voltage is output, an internal system including a voltage input terminal and using the battery voltage as an operating voltage, and an NFC tag circuit configured to connect the voltage output terminal of the battery and the voltage input terminal of the internal system in response to only a system power-on command included in a system power-on NFC signal that is transmitted by an external NFC device and to maintain the connection between the voltage output terminal of the battery and the voltage input terminal of the internal system in response to the battery voltage.

11 Claims, 5 Drawing Sheets

(58) Field of Classification Search
CPC ........... G06K 19/0713; G06K 19/0718; G06K 19/0723
See application file for complete search history.

(56) References Cited

U.S. PATENT DOCUMENTS

2009/0086517 A1* 4/2009 Wei ..................... H02M 3/156
363/50
2015/0305595 A1* 10/2015 Khait ..................... H04B 5/79
307/104

* cited by examiner

NFC DEVICE POWERED ON IN RESPONSE TO RADIO FREQUENCY SIGNAL, NFC TAG CIRCUIT INCLUDED THEREIN, AND METHOD OF OPERATING THE NFC DEVICE

BACKGROUND

Related Application Data

The present application claims priority pursuant to 35 U.S.C. § 119 (a) to Korean Patent Application Number 10-2023-0012337 filed Jan. 31, 2023 which is incorporated herein by reference in its entirety.

1. Technical Field

The present disclosure relates to near field communication (NFC) device, and more particularly, to an NFC device that is powered on in response to a radio frequency (RF) signal transmitted by an external NFC device and that does not have a power button, a passive NFC tag circuit included in the NFC device, and an operating method of the NFC device.

2. Related Art

Radio frequency identification (RFID) is divided into low frequency (LF) RFID, high frequency (HF) RFID, and ultra high frequency (UHF) RFID depending on the frequency of a radio wave that is used for communication.

The range of the LF is 30 kHz to 300 kHz. In general, an LF RFID system operates in 125 kHz or 134.2 kHz.

The range of the HF is 3 MHZ to 30 MHZ. An HF RFID system operates in 13.56 MHz. The HF RFID system using 13.56 MHz means near field communication (NFC).

The range of the UHF is 300 MHz to 3 GHZ. A UHF RFID system operates in 860 MHz to 960 MHz.

A passive RFID tag means a tag that does not include a battery therein. The passive RFID tag generates operating voltages necessary for the passive RFID tag by using an RF signal transmitted by an RFID reader.

PRIOR ART DOCUMENT

Patent Document (Patent Document 1) Korean Patent Application Publication No. 10-2014-0091362 (Jul. 21, 2014)
(Patent Document 2) Korean Patent No. 10-0834841 (Jun. 3, 2008)
(Patent Document 3) U.S. Patent No. U.S. Pat. No. 11,026,609 (Jun. 8, 2021)

SUMMARY

Various embodiments are directed to an NFC device capable of connecting a voltage output terminal of a battery included in the NFC device not having a power button and a voltage input terminal of an internal system included in the NFC device by using an NFC signal transmitted by an external NFC device and then maintaining the connection without any change although any NFC signal is not received from the external NFC device, an NFC tag circuit included in the NFC device, and an operating method of the NFC device.

In an embodiment, an NFC device may include a battery including a voltage output terminal from which a battery voltage is output, an internal system including a voltage input terminal and using the battery voltage as an operating voltage, and an NFC tag circuit configured to connect the voltage output terminal of the battery and the voltage input terminal of the internal system in response to only a system power-on command included in a system power-on NFC signal that is transmitted by an external NFC device and to maintain the connection between the voltage output terminal of the battery and the voltage input terminal of the internal system in response to the battery voltage.

In an embodiment, an operating method of an NFC device not having a power button and including a battery for supplying a battery voltage to an internal system and an NFC tag circuit may include supplying, by the NFC tag circuit, the battery voltage to the internal system having a power-off state by turning on a switch circuit in response to only a system power-on command included in a system power-on NFC signal that is transmitted by an external NFC device, and maintaining, by the NFC tag circuit, the turn-on state of the switch circuit by using the battery voltage that is output by the turned-on switch circuit.

In an embodiment, an NFC tag circuit may include a switch circuit configured to supply a battery voltage of a battery to an internal system having a power-off state, in response to a turn-on switching control signal, and a microcontroller unit configured to generate the turn-on switching control signal in response to a system power-on command included in a system power-on NFC signal that is transmitted by an external NFC device and to maintain the turn-on switching control signal by using the battery voltage that is output by the switch circuit that is turned on in response to the turn-on switching control signal, while the battery voltage is supplied to the internal system through the turned-on switch circuit.

The NFC device not having a power button according to an embodiment of the present disclosure has an effect in that it can maintain a connection between the voltage output terminal of the battery included in the NFC device and the voltage input terminal of the internal system included in the NFC device by using an NFC signal transmitted by an external NFC device, without any change although any NFC signal is not received from the external NFC device.

BRIEF DESCRIPTION OF THE DRAWINGS

A brief description of the drawings is provided so that the drawings cited in the detailed description of the present disclosure are more sufficiently understood.

DETAILED DESCRIPTION

Figure 1:
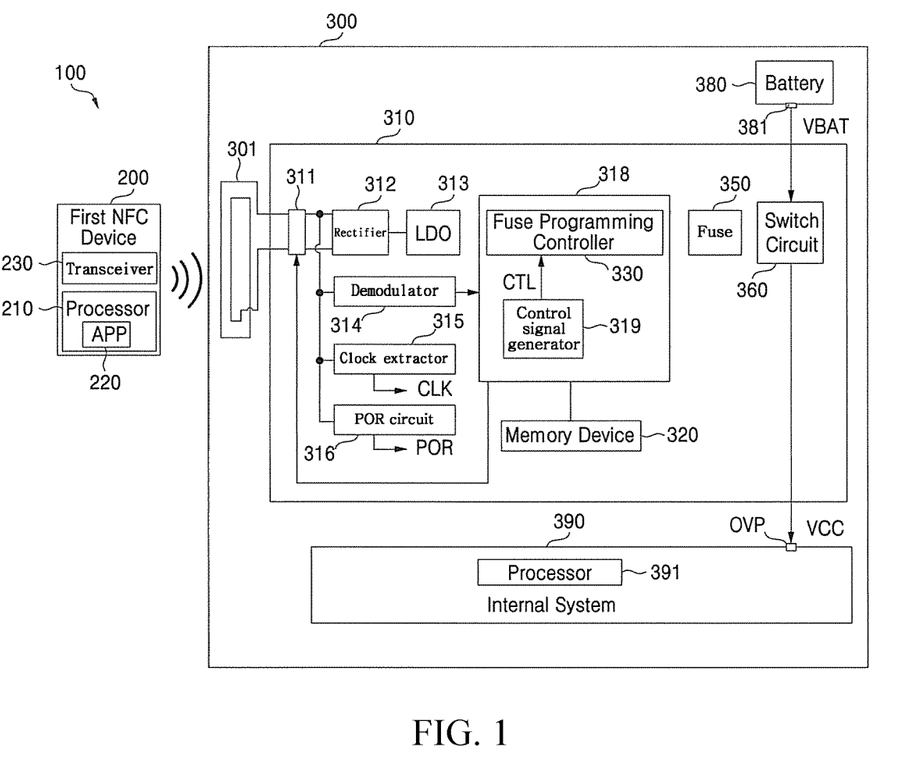
FIG. 1 is a block diagram of an NFC system including an NFC device that does not include a power switch and that is powered on in response to an RF signal according to an embodiment of the present disclosure.

FIG. 1 is a block diagram of an NFC system including an NFC device that does not include a power switch and that is powered on in response to an RF signal according to an embodiment of the present disclosure.

Referring to FIG. 1, an NFC system 100 includes a first NFC device 200 and a second NFC device 300. The first NFC device 200 may be a smartphone, an NFC C reader, or an electronic device including an NFC reader. The second NFC device 300 may be a healthcare device, and may be a portable NFC device.

Furthermore, the second NFC device 300 may be an electronic device including a passive NFC tag circuit 310. According to an embodiment, the passive NFC tag circuit 310 may be an IC, an application-specific integrated circuit (ASIC), a semiconductor chip including an IC (or an ASIC), or an electronic tag chip.

For example, when the lifespan of a battery 380 included in the second NFC device 300 is over, the second NFC device 300 may be a disposable and portable NFC device 300 which cannot be reused. The second NFC device 300 may be attached to human skin.

The first NFC device 200 may power on the second NFC device 300 by using a radio frequency (RF) signal (e.g., an NFC signal having a 13.56 MHz band).

When the second NFC device 300 is powered on (or "woke up") by the first NFC device 200, this means that a battery voltage VBAT of the battery 380 included in the second NFC device 300 is supplied as an operating voltage of an internal system 390 that is embedded in the second NFC device 300.

The first NFC device 200 includes a processor 210 for executing an application (APP) 220 (or a mobile application) and a transceiver 230 capable of exchanging RF signals with the second NFC device 300. The application 220 is an abbreviation of an application program. The application program is a program that is designed to enable a user or another application program in some cases to directly perform a specific function. An operation of the application 220 will be described in detail with reference to FIG. 3.

The second NFC device 300 includes an antenna 301, the passive NFC tag circuit 310, the battery 380, and the internal system 390. The components 301, 310, 380, and 390 are protected by the housing of the second NFC device 300.

From a viewpoint of the second NFC device 300, the second NFC device 300 includes the battery 380 for only an operation of the internal system 390. However, from a viewpoint of the passive NFC tag circuit 310, the passive NFC tag circuit 310 generates an operating voltage by using only an NFC signal transmitted by the first NFC device 200, without exchanging NFC signals with the first NFC device 200 by using the battery voltage VBAT of the battery 380.

The internal system 390 may be a continuous glucose monitoring system (CGMS), and may be a biosensor system including a biosensor for analysis in which a biological factor and a physicochemical sensor are combined.

The housing means a portion (i.e., a frame for protection) or case for protecting the sensitive components 301, 310, 380, and 390 having a good possibility that a problem may occur when the second NFC device 300 comes into contact with the outside in any form by covering the sensitive components with a frame in order to protect the sensitive components. The second NFC device 300 may be waterproofed to an IP68 grade by using a water-resistant material included in the housing.

According to an embodiment of the present disclosure, any external device (e.g., a power button or a power switch) capable of controlling the supply of the battery voltage VBAT of the battery 380 to the internal system 390 is not installed outside the second NFC device 300 that is fully covered with the housing.

Accordingly, a user of the second NFC device 300 cannot supply the battery voltage VBAT of the battery 380 to the internal system 390 unless the second NFC device 300 receives a system power-on NFC signal including a system power-on command from the first NFC device 200.

The second NFC device 300 may exchange RF signals (e.g., NFC signals or RFID signals) with the transceiver 230 of the first NFC device 200 through the antenna 301. For example, the antenna 301 may be a coil antenna or a loop antenna.

The passive NFC tag circuit 310 receives a system power-on command included in a system power-on NFC signal from the first NFC device 200 through the antenna 301, connects a voltage output terminal 381 of the battery 380 and a voltage input terminal OVP of the internal system 390 in response to the received system power-on command, and then maintains the connection between the voltage output terminal 381 of the battery 380 and the voltage input terminal OVP of the internal system 390 (more specifically, maintains the connection until the lifespan of the battery 380 is over) by using the battery voltage VBAT although any NFC signal is not additionally received from the first NFC device 200.

The passive NFC tag circuit 310 performs only a function of controlling the connection between the voltage output terminal 381 of the battery 380 and the voltage input terminal OVP of the internal system 390, and generates a voltage that is necessary for at least one of the components 314, 315, 316, 318, and 320 included in the passive NFC tag circuit 310 by using only an NFC signal transmitted by the first NFC device 200 instead of the battery voltage VBAT of the battery 380.

The passive NFC tag circuit 310 includes a modulator 311, a rectifier 312, a regulator (LDO) 313, a demodulator 314, a clock extractor 315, a power-on reset (POR) circuit 316, an NFC microcontroller unit (MCU) 318 also called an NFC control logic circuit, a memory device 320, a voltage supply control circuit 350, and a switch circuit 360.

A transmission and reception circuit includes the modulator 311 and the demodulator 314, and performs a function for receiving and demodulating an RF signal transmitted by the first NFC device 200, transmitting the demodulated signal to the NFC MCU 318, generating an RF signal by modulating a signal transmitted by the NFC MCU 318, and transmitting the RF signal to the first NFC device 200.

The antenna 301 receives an NFC signal of 13.56 MHZ that is emitted by the transceiver 230 of the first NFC device 200. According to an embodiment, in order to prevent an output voltage of the antenna 301 from being excessively increased, a limiter (not illustrated) may be used between the antenna 301 and the modulator 311.

In order to extract an operating voltage of the passive NFC tag circuit 310, the output voltage of the antenna 301 is supplied to the rectifier 312. The regulator 313 generates a DC voltage (or a constant voltage) by using (or regulating) a voltage rectified by the rectifier 312. The regulator 313 may be a linear regulator, and may be a low drop-output (LDO) regulator.

When the output voltage of the antenna 301 is sufficiently increased, a power-on reset signal POR is generated by the POR circuit 316. The power-on reset signal POR activates the components (e.g., 311, 314, 315, and/or 316) of an analog frontend (AFE) and the components (e.g., 318 and/or 320) of a digital circuit.

The clock extractor 315 extracts a clock (or a clock signal CLK) for the components (e.g., 318 and/or 320) of the digital circuit from the output voltage of the antenna 301. Accordingly, the passive NFC tag circuit 310 operates synchronously with the NFC signal transmitted by the first NFC device 200.

In order to receive an NFC signal data or information) from the first NFC device 200, the demodulator 314 is used. For example, the demodulator 314 demodulates the NFC signal (or data or information) received from the first NFC device 200 by using an envelope detector, and transmits the demodulated signal (e.g., a demodulated digital signal) to the NFC MCU 318.

The modulator 311 is used in order to transmit, to the first NFC device 200, data transmitted by the NFC MCU 318. According to an embodiment, the modulator 311 modulates the data transmitted by the NFC MCU 318 by using load modulation, and transmits the modulated NFC signal to the first NFC device 200 through the antenna 301.

Figure 2:
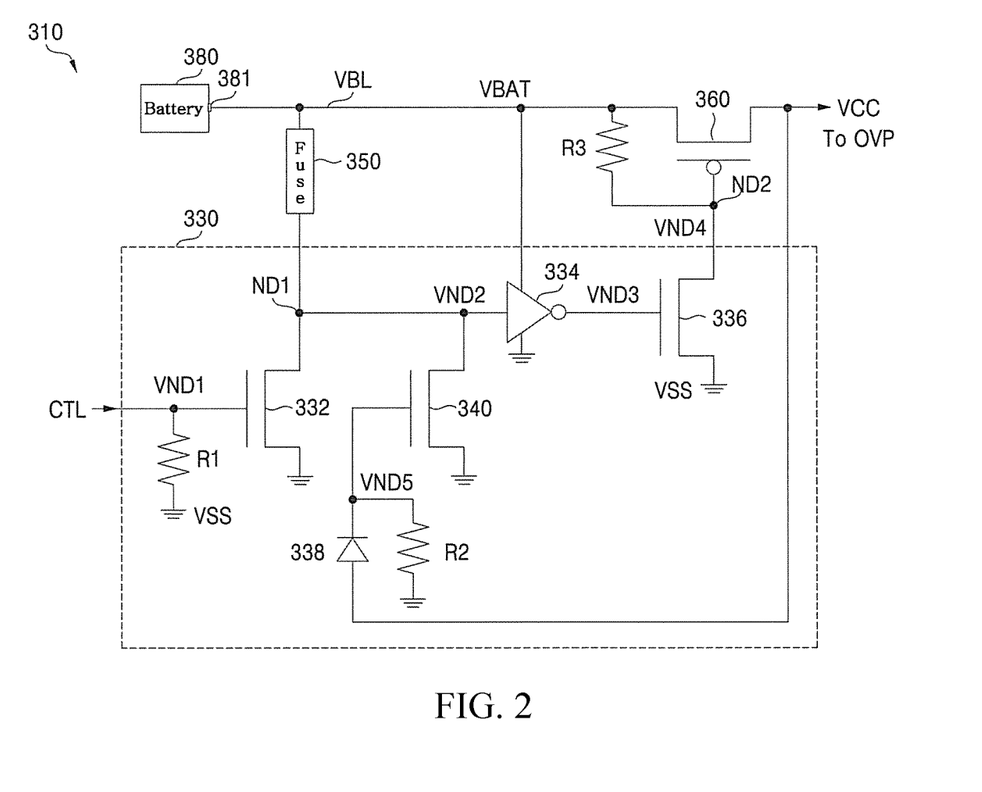
FIG. 2 is a circuit diagram of a passive NFC tag circuit illustrated in FIG. 1.

FIG. 2 is a circuit diagram of the passive NFC tag circuit illustrated in FIG. 1.

FIG. 2 illustrates the battery 380 and the components (350, R3, and 360) along with an internal system power-on controller 330, for convenience of description.

Referring to FIGS. 1 and 2, the NFC MCU 318 decodes a demodulated system power-on command included in a system power-on signal demodulated by the demodulator 314, generates a control signal CTL corresponding to the results of the decoding, and transmits the control signal CTL to the internal system power-on controller 330. For example, the control signal CTL may be a 1-bit signal (e.g., a voltage regulated by the regulator 313), but the present disclosure is not limited thereto.

The NFC MCU 318 includes a control signal generator 319 and the internal system power-on controller 330.

The control signal generator 319 generates the control signal CTL in response to the demodulated system power-on command included in the system power-on signal demodulated by the demodulator 314 (or by decoding the system power-on command).

The internal system power-on controller 330 may control an operation of the voltage supply control circuit 350. For example, if the voltage supply control circuit 350 is a fuse, the internal system power-on controller 330 may be a fuse programming controller capable of making the fuse an open circuit.

The internal system power-on controller 330 performs a function for generating a turn-on switching control signal VND4 in response to the control signal CTL that is generated by the control signal generator 319 and that has a first state, and maintaining the turn-on switching control signal VND4 in response to the battery voltage (VBAT=VCC) that is output by the switch circuit 360. It is assumed that the first state is a first level or a high level and a second state is a second level or a low level.

It is assumed that if a voltage drop attributable to the switch circuit 360 is not taken into consideration, an output voltage VCC of the switch circuit 360 is identical with the battery voltage VBAT.

The memory device 320 stores a unique identifier (UID) by which the second NFC device 300 can be uniquely identified, and may be implemented as a non-volatile memory device, such as electrically erasable programmable read-only memory (EEPROM).

The switch circuit 360 includes a switch control terminal (e.g., a gate terminal of a PMOS transistor 360), and electrically connects the voltage output terminal 381 of the battery 380 and the voltage input terminal OVP of the internal system 390 in response to the turn-on switching control signal VND4 that is input to the switch control terminal.

FIG. 2 also illustrates the fuse programming controller (or the internal system power-on controller 330), the fuse 350, a pull-up resistor R3 (also called a third resistor), the switch circuit 360, and the battery 380, for convenience of description.

The fuse programming controller 330 includes a first pull-down circuit 332, a first pull-down resistor R1 (also called a "first resistor"), an inverter 334, a second pull-down circuit 336, a diode 338, a second pull-down resistor R2 (also called a "second resistor"), and a third pull-down circuit 340.

The fuse 350 is connected between a voltage transmission line VBL along which the battery voltage VBAT is supplied and a first node ND1, and may become an open circuit that is broken by a current flowing into the first pull-down circuit 332.

The first pull-down circuit 332 includes a first control terminal for receiving the control signal CTL, and pulls down a voltage VND2 of the first node ND1 to a ground VSS in response to the control signal CTL that is input to the first control terminal and that has the first state. If the first pull-down circuit 332 is a first NMOS transistor, the first control terminal is a gate terminal of the first NMOS transistor 332.

The first pull-down resistor R1 is connected between the gate terminal of the first NMOS transistor 332 and the ground VSS.

The inverter 334 is connected between the voltage transmission line VBL and the ground VSS, and inverts the voltage VND2 of the first node ND1.

The second pull-down circuit 336 pulls down the voltage VND4 of a switch control terminal of the switch circuit 360 to the ground VSS in response to an output voltage VND3 of the inverter 334, which is supplied to a second control terminal connected to an output terminal of the inverter 334. If the second pull-down circuit 336 is a second NMOS transistor, the second control terminal is a gate terminal of the second NMOS transistor 336.

The pull-up resistor R3 is connected between the voltage transmission line VBL and a second node ND2. The second node ND2 is connected to the switch control terminal of the switch circuit 360. If the switch circuit 360 is a PMOS transistor, the switch control terminal is the gate terminal of the PMOS transistor 360.

The diode 338 is connected between an output terminal of the switch circuit 360 and a third control terminal of the third pull-down circuit 340. A current corresponding to the output voltage VCC of the switch circuit 360 is supplied to the third control terminal of the third pull-down circuit 340. The output voltage VCC of the switch circuit 360 corresponds to the battery voltage VBAT. The output voltage VCC of the switch circuit 360 is supplied to the voltage input terminal OVP of the internal system 390.

The second pull-down resistor R2 is connected between an output terminal (e.g., a cathode) of the diode 338 and the ground VSS.

The third pull-down circuit 340 pulls down the voltage VND2 of the first node ND1 to the ground VSS, in response to an output voltage VND5 of the diode 338, which is input to the third control terminal. If the third pull-down circuit 340 is a third NMOS transistor, the third control terminal is a gate terminal of the third NMOS transistor 340.

Figure 3:
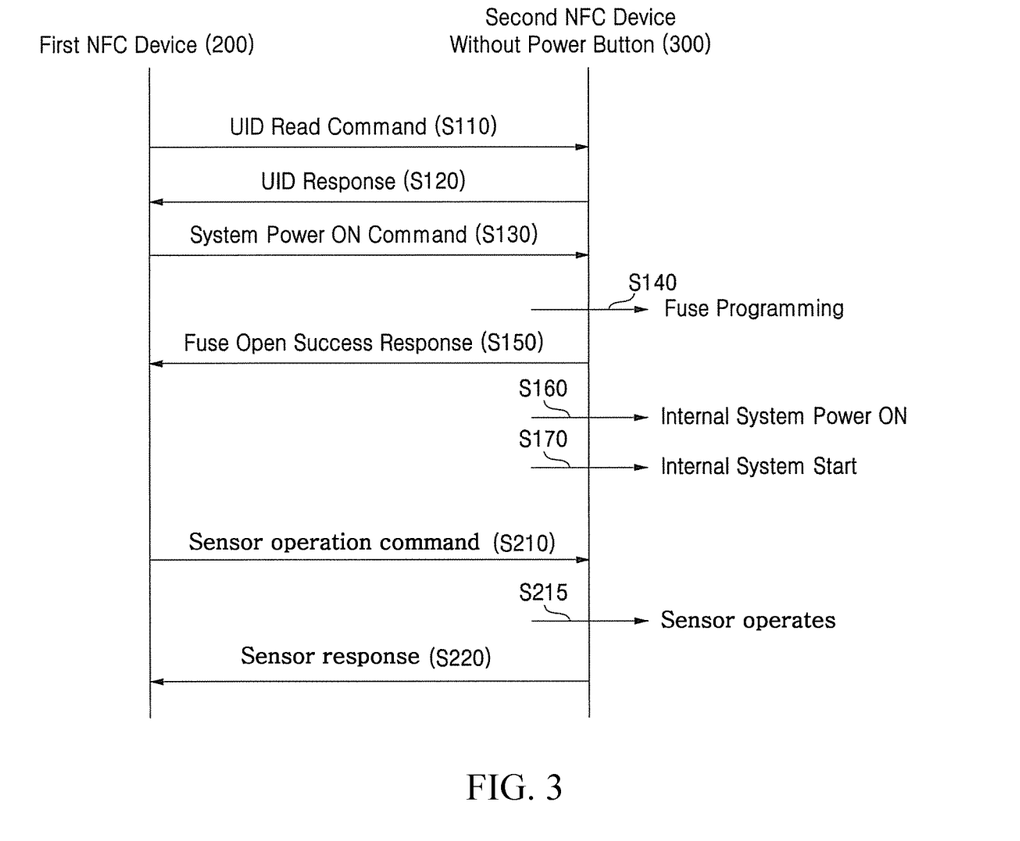
FIG. 3 is a data flow that describes an operating method of the NFC system illustrated in FIG. 1.
Figure 4:
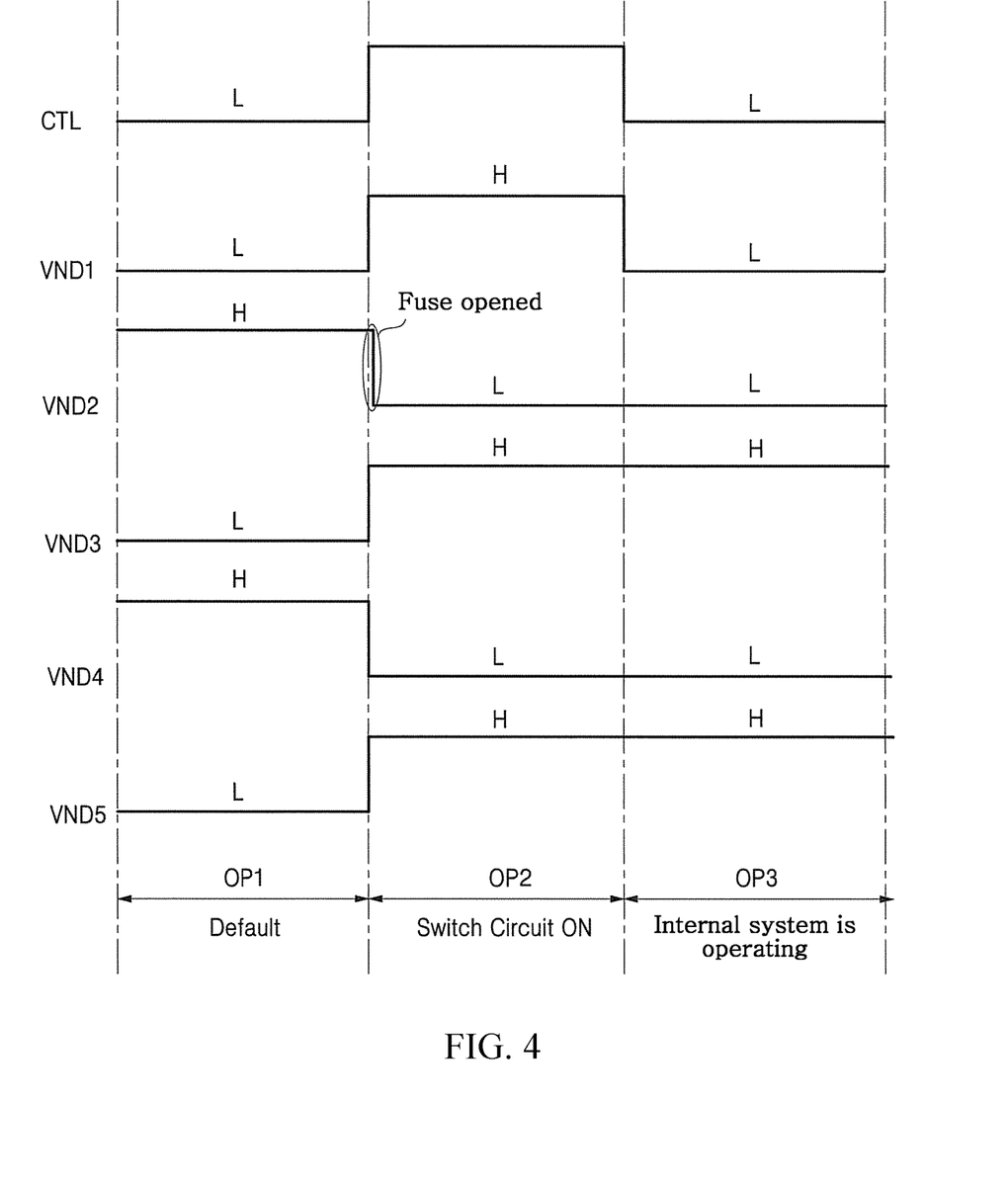
FIG. 4 is a timing diagram of voltages for describing an operation of the passive NFC tag circuit illustrated in FIG. 2.

FIG. 3 is a data flow that describes an operating method of the NFC system illustrated in FIG. 1. FIG. 4 is a timing diagram of voltages for describing an operation of the passive NFC tag circuit illustrated in FIG. 2.

Each of the signals CTL, VND1, VND2, VND3, VND4, and VND5 is represented as a digital signal in FIG. 4 for convenience of description, but each of the signals CTL, VND1, VND2, VND3, VND4, and VND5 may mean an analog signal.

In a first operation mode OP1, an operation of the second NFC device 300 is described with reference to FIGS. 1, 2, and 4.

In the first operation mode OP1, the first NFC device 200 does not transmit any RF signal (e.g., any NFC signal) to the second NFC device 300. That is, the second NFC device 300 is not supplied with RF power (also called energy) by an RF signal from the first NFC device 200. The first operation mode OP1 may be called a default mode.

In the first operation mode OP1, an output voltage of each of the rectifier 312 and the regulator 313 is 0 (zero) V because the second NFC device 300 is not supplied with RF power by an RF signal from the first NFC device 200. It is assumed that in the first operation mode OP1, the fuse 350 is a short circuit.

The level of a voltage (VND1=CTL) that is input to the gate terminal of the first NMOS transistor 332 is the low level L because the control signal generator 319 generates the control signal CTL having the second state (e.g., the low level L or the ground voltage level). The level of a voltage (VND2=VBAT) of the first node ND1 is the high level H because the battery voltage VBAT is supplied to the first node ND1 through the fuse 350.

The inverter 334 outputs the voltage VND3 having the low level L by inverting the voltage VND2 having the high level H, so that the second NMOS transistor 336 is turned off.

When the state of the second NMOS transistor 336 is an off state, the battery voltage VBAT is supplied to the gate terminal of the PMOS transistor 360 through the pull-up resistor R3. Accordingly, the level of the voltage VND4 that is supplied to the gate terminal of the PMOS transistor 360, that is, the turn-on switching control signal VND4, is the high level H.

Accordingly, since the PMOS transistor 360 maintains the off state, the third NMOS transistor 340 maintains the off state because the level of the voltage VND5 that is supplied to the gate terminal of the third NMOS transistor 340 is the low level L.

Accordingly, since the voltage (VND2=VBAT) of the first node ND1 maintains the high level H, the PMOS transistor 360 maintains the off state.

In a second operation mode OP2, an operation of the second NFC device 300 is described with reference to FIGS. 1 to 4.

In the second operation mode OP2, the application 220 of the first NFC device 200 transmits, to the second NFC device 300, a UID read NFC signal including a UID read command through the transceiver 230 (S110).

In the second operation mode OP2, the second NFC device 300 is supplied with RF power by an RF signal from the first NFC device 200. Accordingly, the rectifier 312 generates a rectified voltage by rectifying the UID read NFC signal that is received through the antenna 301. The regulator 313 supplies the regulated voltage to at least one of the components 314, 315, 316, 318, and 320 by regulating the rectified voltage.

The demodulator 314 receives the UID read NFC signal through the antenna 301, demodulates the received UID read NFC signal, and transmits the demodulated UID read signal to the NFC MCU 318.

The NFC MCU 318 or the control signal generator 319 decodes the UID read command included in the demodulated UID read signal, generates the control signal CTL having the low level L based on the results of the decoding, reads a unique identifier (UID) from the memory device 320, and transmits, to the modulator 311, a UID response including the UID.

The modulator 311 modulates the UID response including the UID of the second NFC device 300, and transmits a UID response NFC signal to the transceiver 230 of the first NFC device 200 through the antenna 301 (S120).

Since the level of the control signal CTL is the low level L, the voltage (VND2=VBAT) of the first node ND1 maintains the high level H, and the PMOS transistor 360 maintains the off state.

After receiving the UID response NFC signal through the transceiver 230, the application 220 of the first NFC device 200 generates a system power-on NFC signal including a system power-on command, and transmits the system power-on NFC signal to the antenna 301 of the second NFC device 300 through the transceiver 230 (S130).

In the second operation mode OP2, the second NFC device 300 is supplied with the RF power by the RF signal from the first NFC device 200. Accordingly, the rectifier 312 generates a rectified voltage by rectifying the system power-on NFC signal that is received through the antenna 301. The regulator 313 supplies the rectified voltage to at least one of the components 314, 315, 316, 318, and 320 by regulating the regulated voltage.

The demodulator 314 receives the system power-on NFC signal through the antenna 301, demodulates the received system power-on NFC signal, and transmits the demodulated system power-on signal to the NFC MCU 318.

The NFC MCU 318 or the control signal generator 319 decodes the system power-on command included in the demodulated system power-on signal, generates the control signal CTL having the high level H based on the results of the decoding, and transmits the control signal CTL to the fuse programming controller 330.

The battery voltage VBAT is supplied to the first node ND1 through the fuse 350, so that the level of the voltage (VND2=VBAT) of the first node ND1 is the high level H.

When the level of the voltage (VND1=CTL) that is input to the gate terminal of the first NMOS transistor 332 is the high level H, the first NMOS transistor 332 is turned on. Accordingly, the fuse 350 is programmed as an open circuit by a current that flows into the turned-on first NMOS transistor 332 (S140). Accordingly, the level of the voltage of the first node ND1 is pulled down from the high level H to the low level L.

The second NMOS transistor 336 is turned on because the inverter 334 outputs the voltage VND3 having the high level H by inverting the voltage VND2 having the low level L.

As the second NMOS transistor 336 is turned on, the level of the voltage VND4 that is supplied to the gate terminal of the PMOS transistor 360, that is, the turn-on switching control signal VND4, is pulled down from the high level H to the low level L, and the PMOS transistor 360 is turned on.

As the PMOS transistor 360 is turned on, the output voltage VCC of the PMOS transistor 360 corresponding to the battery voltage VBAT is supplied to the diode 338 and the voltage input terminal OVP of the internal system 390.

When a resistance value of the second pull-down resistor R2 is small and the level of the output voltage VND5 of the diode 338 is the high level H, the third NMOS transistor 340 maintains the turn-on state because the output voltage VND5 of the diode 338 can maintain the turn-on of the third NMOS transistor 340, and the voltage of the first node ND1 maintains the low level L because the third NMOS transistor 340 maintains the turn-on state.

As the voltage of the first node ND1 maintains the low level L, the second NMOS transistor 336 maintains the turn-on state, and the PMOS transistor 360 also maintains the turn-on state.

Accordingly, the output voltage VCC of the PMOS transistor 360 corresponding to the battery voltage VBAT is continuously supplied to the diode 338 and the voltage input terminal OVP of the internal system 390. The diode 338 makes a current flow in one direction, and supplies the output voltage VCC of the PMOS transistor 360 to the gate terminal of the NMOS transistor 340. Accordingly, the NMOS transistor 340 maintains the turn-on state, and the voltage VND1 of the first node ND1 maintains the ground voltage level, that is, the low level L.

After the fuse 350 is broken and the fuse 350 is programmed as an open circuit, the NFC MCU 318 transmits a fuse-open success response to the modulator 311.

The modulator 311 generates a fuse-open success response NFC signal by modulating the fuse-open success response, and then transmits the generated fuse-open success response NFC signal to the transceiver 230 of the first NFC device 200 through the antenna 301 (S150).

The application 220 of the first NFC device 200 receives the fuse-open success response NFC signal through the transceiver 230, and interprets the received fuse-open success response NFC signal.

The internal system 390 is powered on (S160) in response to the output voltage VCC of the PMOS transistor 360 corresponding to the battery voltage VBAT, and starts to operate (S170).

In a third operation mode OP3, an operation of the second NFC device 300 is described with reference to FIGS. 1, 2, and 4.

In the third operation mode OP3, although the second NFC device 300 does not receive any RF signal (e.g., an NFC signal) from the first NFC device 200, the battery voltage VBAT is supplied to the internal system 390 by the internal system power-on controller 330.

In the third operation mode OP3, when the second NFC device 300 is not supplied with RF power by an RF signal from the first NFC device 200, the output voltage of each of the rectifier 312 and the regulator 313 is 0 V. Since the fuse 350 has been programmed as an open circuit in the second operation mode OP2, the fuse 350 maintains the open circuit without any change even in the third operation mode OP3.

Although the control signal generator 319 generates the control signal CTL having the low level L, the PMOS transistor 360 maintains the turn-on state without any change by the internal system power-on controller 330.

Accordingly, since the output voltage VND5 of the diode 338 having the high level (VBAT=VCC=H) is supplied to the gate terminal of the third NMOS transistor 340, the third NMOS transistor 340 maintains the turn-on state, and the voltage VND2 of the first node ND1 maintains the low level L.

The second NMOS transistor 336 maintains the turn-on state because the inverter 334 outputs the voltage VND3 having the high level H by inverting the voltage VND2 having the low level L.

When the second NMOS transistor 336 maintains the turn-on state, the turn-on switching control signal VND4 maintains the low level L by the turned-on second NMOS transistor 336. Accordingly, the PMOS transistor 360 maintains the turn-on state in response to the turn-on switching control signal VND4 having the low level L.

While the PMOS transistor 360 maintains the turn-on state, the output voltage VCC of the PMOS transistor 360, which corresponds to the battery voltage VBAT, is supplied to the diode 338 and the voltage input terminal OVP of the internal system 390.

Accordingly, the internal system 390 continuously operates in response to the battery voltage VBAT because the PMOS transistor 360 maintains the turn-on state and the output voltage VCC of the PMOS transistor 360 is supplied to the internal system 390.

Figure 5:
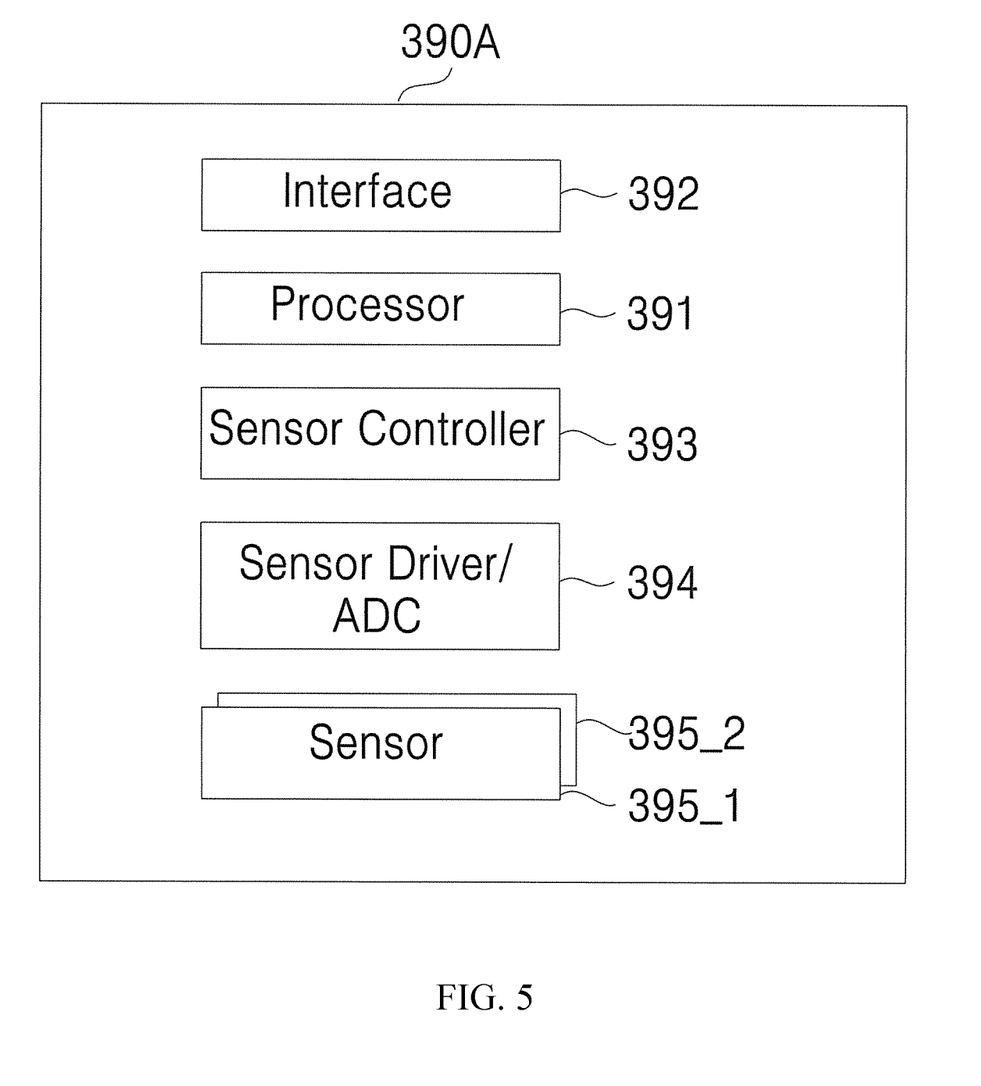
FIG. 5 is an embodiment of a block diagram of an internal system illustrated in FIG. 1.

FIG. 5 is an embodiment of a block diagram of the internal system illustrated in FIG. 1.

An internal system 390A in FIG. 5 is an embodiment of the internal system 390 illustrated in FIG. 1. The internal system 390A includes a processor 391 (also called an "MCU"), an interface 392, a sensor controller 393, a signal processing circuit 394 including a sensor driver and an analog digital converter (ADC), and at least one sensor 395_1 and 395_2.

Referring to FIGS. 4 and 5, after the second operation mode OP2 is performed, that is, the battery voltage VBAT is supplied to the internal system 390, the application 220 of the first NFC device 200 transmits, to the second NFC device 300, a sensor operation NFC signal including a sensor operation command through the transceiver 230 (S210).

Since the second NFC device 300 is supplied with power by a sensor operation NFC signal from the first NFC device 200, the rectifier 312 generates a rectified voltage by rectifying the sensor operation NFC signal that is received through the antenna 301. The regulator 313 supplies the rectified voltage to at least one of the components 314, 315, 316, 318, and 320 by regulating the regulated voltage.

The demodulator 314 receives the sensor operation NFC signal through the antenna 301, demodulates the received sensor operation NFC signal, and transmits the demodulated sensor operation signal to the NFC MCU 318.

The NFC MCU 318 or the control signal generator 319 decodes the sensor operation command included in the demodulated sensor operation signal, generates a first sensor control signal for controlling an operation of at least one of the sensors 395_1 and 395_2 based on the results of the decoding, and transmits the first sensor control signal to the interface 392 of the internal system 390A.

As described above, since the battery voltage VBAT is supplied to the voltage input terminal OVP of the internal system 390A through the switch circuit 360, the internal system 390A is operating.

The processor 391 receives the first sensor control signal through the interface 392, interprets the first sensor control signal, generates a second sensor control signal corresponding to the results of the interpretation, and transmits the second sensor control signal to the sensor controller 393.

The sensor controller 393 receives and interprets the second sensor control signal, and transmits a sensor driving signal to the sensor driver included in the signal processing circuit 394. The sensor driver drives at least one of the sensors 395_1 and 395_2 by using the sensor driving signal.

For example, the first sensor 395_1 may be a glucose sensor, a sensor for continuous glucose monitoring (GCM), or a biosensor, and the second sensor 395_2 may be a temperature sensor, but the present disclosure is not limited thereto.

The analog digital converter of the signal processing circuit 394 receives an analog detection signal from at least one of the sensors 395_1 and 395_2, converts the analog detection signal into a first digital detection signal, and transmits the first digital detection signal to the sensor controller 393 (S215).

The sensor controller 393 generates a second digital signal corresponding to the first digital detection signal, and transmits the second digital signal to the processor 391. The processor 391 generates a sensor response corresponding to the second digital signal, and transmits the sensor response to the NFC MCU 318 through the interface 392.

The NFC MCU 318 transmits the sensor response to the modulator 311. The demodulator 314 transmits, to the transceiver 230 of the first NFC device 200, a sensor response NFC signal that is generated by modulating the sensor response through the antenna 301 (S220). The application 220 of the first NFC device 200 processes the sensor response NFC signal that is received through the transceiver 230.

The present disclosure has been described with reference to the embodiments illustrated in the accompanying drawings, but the embodiments are merely illustrative. A person having ordinary knowledge in the art will understand that various modifications and other equivalent embodiments are possible from the embodiments. Accordingly, the true technical range of protection of the present disclosure should be defined by the appended claims.

[Description of reference numerals]

| | |
|---|---|
| 100: NFC system | 200: first NFC device |
| 210: processor | 220: application |
| 230: transceiver | 300: second NFC device |
| 301: antenna | 310: passive NFC tag circuit |
| 312: rectifier | 314: demodulator |
| 316: POR circuit | 318: NFC control logic circuit (NFC MCU) |
| 319: control signal generator | 320: memory device |
| 330: internal system power-on controller or fuse programming circuit | |
| 350: fuse | 380: battery |
| 390: internal system | |

What is claimed is:

1. A near field communication (NFC) device comprising:
a battery comprising a voltage output terminal from which a battery voltage is output;
an internal system comprising a voltage input terminal and using the battery voltage as an operating voltage; and
an NFC tag circuit configured to connect the voltage output terminal of the battery and the voltage input terminal of the internal system in response to only a system power-on command included in a system power-on NFC signal that is transmitted by an external NFC device and to maintain the connection between the voltage output terminal of the battery and the voltage input terminal of the internal system in response to the battery voltage;
wherein the NFC tag circuit comprises:
a switch circuit comprising a switch control terminal and configured to connect the voltage output terminal of the battery and the voltage input terminal of the internal system in response to a turn-on switching control signal that is input to the switch control terminal; and
a microcontroller unit configured to generate the turn-on switching control signal in response to the system power-on command and then maintain the turn-on switching control signal by using the battery voltage that is output through the switch circuit;
wherein the microcontroller unit comprises:
a control signal generator configured to generate a control signal by interpreting the system power-on command; and
an internal system power-on controller configured to generate the turn-on switching control signal for connecting the voltage output terminal of the battery to the voltage input terminal of the internal system in response to the control signal and then maintain the turn-on switching control signal by using the battery voltage that is output by the switch circuit;
wherein:
the NFC device further comprises a voltage supply control circuit configured to supply the battery voltage to a first node, and
the internal system power-on controller comprises:
a first pull-down circuit comprising a first control terminal and configured to pull down a voltage of the first node to a ground in response to the control signal that is input to the first control terminal;
an inverter configured to invert the voltage of the first node;
a second pull-down circuit configured to pull down a voltage of the switch control terminal to the ground in response to an output signal of the inverter; and
a third pull-down circuit comprising a second control terminal and configured to pull down the voltage of the first node to the ground, in response to the battery voltage that is output by the switch circuit and that is input to the second control terminal,
wherein when the voltage of the first node is pulled down to the ground by the first pull-down circuit, the voltage supply control circuit becomes an open circuit.

2. The NFC device of claim 1, wherein the NFC tag circuit comprises:
a rectifier configured to receive the system power-on NFC signal from the external NFC device through an antenna and rectify the received system power-on NFC signal;
a regulator configured to generate a constant voltage by receiving an output voltage of the rectifier;
a demodulator configured to generate a demodulated system power-on signal by demodulating the system power-on NFC signal received through the antenna;
a switch circuit configured to connect the voltage output terminal of the battery and the voltage input terminal of the internal system in response to a turn-on switching control signal; and
a microcontroller unit configured to use the constant voltage as an operating voltage and generate the turn-on switching control signal by decoding the demodulated system power-on signal output by the demodulator.

3. The NFC device of claim 1, wherein:
the NFC device further comprises a voltage supply control circuit configured to supply the battery voltage to a first node, and
the internal system power-on controller comprises:
a first pull-down circuit comprising a first control terminal and configured to pull down a voltage of the first node to a ground in response to the control signal that is input to the first control terminal;
an inverter configured to invert the voltage of the first node;
a second pull-down circuit configured to pull down a voltage of the switch control terminal to the ground in response to an output signal of the inverter; and
a third pull-down circuit comprising a second control terminal and configured to pull down the voltage of the first node to the ground, in response to the battery voltage that is output by the switch circuit and that is input to the second control terminal,
when the voltage of the first node is pulled down to the ground by the first pull-down circuit, the voltage supply control circuit becomes an open circuit.

4. The NFC device of claim 3, wherein the voltage supply control circuit is a fuse.

5. The NFC device of claim 3, further comprising a pull-up resistor connected between the voltage output terminal of the battery and the switch control terminal of the switch circuit.

6. The NFC device of claim 3, wherein the internal system power-on controller comprises:
a first pull-down resistor connected between the first control terminal and the ground;
a diode connected between an output terminal of the switch circuit and the second control terminal; and
a second pull-down resistor connected between the second control terminal and the ground.

7. The NFC device of claim 1, wherein the internal system comprises a processor configured to operate by using only the battery voltage.

8. The NFC device of claim 7, wherein the internal system further comprises:
an interface configured to transmit, to the processor, a signal that is transmitted by the NFC tag circuit;
a sensor;
a sensor driver configured to drive the sensor in response to a sensor driving signal; and
a sensor controller configured to generate the sensor driving signal under a control of the processor,
wherein the processor, the interface, the sensor, the sensor driver, and the sensor controller operate by using only the battery voltage.

9. The NFC device of claim 8, wherein the sensor is a biosensor.

10. A near field communication (NFC) tag circuit comprising:
a switch circuit configured to supply a battery voltage of a battery to an internal system having a power-off state, in response to a turn-on switching control signal; and
a microcontroller unit configured to generate the turn-on switching control signal in response to a system power-on command included in a system power-on NFC signal that is transmitted by an external NFC device and to maintain the turn-on switching control signal by using the battery voltage that is output by the switch circuit that is turned on in response to the turn-on switching control signal, while the battery voltage is supplied to the internal system through the turned-on switch circuit;
wherein:
the NFC tag circuit further comprises a voltage supply control circuit configured to supply the battery voltage to a first node, and
the microcontroller unit comprises:
a control signal generator configured to generate a control signal by interpreting the system power-on command;
a first pull-down circuit comprising a first control terminal and configured to pull down a voltage of the first node to a ground in response to the control signal that is input to the first control terminal;
an inverter configured to invert the voltage of the first node;
a second pull-down circuit configured to generate the turn-on switching control signal in response to an output signal of the inverter; and
a third pull-down circuit comprising a second control terminal and configured to pull down the voltage of the first node to the ground, in response to the battery voltage output by the switch circuit that is input to the second control terminal,
wherein when the voltage of the first node is pulled down to the ground by the first pull-down circuit, the voltage supply control circuit becomes an open circuit.

11. The NFC tag circuit of claim 10, further comprising:
a first resistor connected between the first control terminal and the ground;
a diode connected between an output terminal of the switch circuit and the second control terminal;
a second resistor connected between the second control terminal and the ground; and
a third resistor connected between a voltage output terminal of the battery from which the battery voltage is output and a switch control terminal of the switch circuit to which the turn-on switching control signal is input.

* * * * *